US009164514B1

(12) United States Patent
Avery et al.

(10) Patent No.: US 9,164,514 B1
(45) Date of Patent: Oct. 20, 2015

(54) COOPERATIVE PERIMETER PATROL SYSTEM AND METHOD

(71) Applicant: Southwest Research Institute, San Antonio, TX (US)

(72) Inventors: Paul A. Avery, San Antonio, TX (US); Samuel E. Slocum, San Antonio, TX (US); Jerry A. Towler, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 46 days.

(21) Appl. No.: 14/252,581

(22) Filed: Apr. 14, 2014

(51) Int. Cl.
*G01S 13/88* (2006.01)
*G05D 1/02* (2006.01)
*G08B 1/08* (2006.01)
*G08B 13/00* (2006.01)

(52) U.S. Cl.
CPC ............... *G05D 1/0291* (2013.01); *G08B 1/08* (2013.01); *G08B 13/00* (2013.01); *G08B 2001/085* (2013.01)

(58) Field of Classification Search
USPC ......... 701/2, 400, 25, 26, 1, 23, 24, 408, 467, 701/468, 514, 516, 517, 519, 521, 540, 301, 701/302; 706/45, 46
See application file for complete search history.

(56) References Cited

U.S. PATENT DOCUMENTS

| 8,437,890 | B2 * | 5/2013 | Anderson et al. ................. 701/3 |
| 8,731,777 | B2 * | 5/2014 | Castaneda et al. .............. 701/41 |
| 8,793,069 | B2 * | 7/2014 | Kuroda .......................... 701/519 |
| 2005/0104745 | A1 * | 5/2005 | Bachelder et al. ............ 340/906 |
| 2009/0157236 | A1 * | 6/2009 | Van Gaasbeck et al. ......... 701/3 |
| 2009/0207020 | A1 * | 8/2009 | Garnier et al. ................ 340/541 |
| 2013/0054133 | A1 * | 2/2013 | Lewis et al. .................. 701/423 |
| 2014/0253722 | A1 * | 9/2014 | Smyth ........................... 348/135 |
| 2015/0025708 | A1 * | 1/2015 | Anderson ......................... 701/2 |

* cited by examiner

*Primary Examiner* — Ronnie Mancho
(74) *Attorney, Agent, or Firm* — Grossman, Tucker et al (57) ABSTRACT

A method of patrolling a perimeter of a geographic area, using two or more unmanned vehicles having means for locomotion along a perimeter path. Each vehicle is equipped with at least the following systems: a navigation system operable to autonomously navigate the unmanned vehicle, an anomaly detection system, a communications system, an anomaly tracking system, operable to track, visually or by following, a detected anomaly, and an alert evaluation system. Each vehicle travels the path on a predetermined route, and is operable to broadcast an alert message to all other vehicles if that vehicle detects an anomaly, to perform an evaluation of any received alert message to determine if it will travel to an anomaly based on stored evaluation rules, and to respond to an alert message based on the evaluation.

15 Claims, 7 Drawing Sheets

COOPERATIVE PERIMETER PATROL SYSTEM AND METHOD

TECHNICAL FIELD OF THE INVENTION

This invention relates to patrolling the perimeter of a secured (protected) region, and more particularly, to patrolling with unmanned ground vehicles under decentralized control.

BACKGROUND OF THE INVENTION

For various reasons, it is often desired to patrol the geographic perimeter of an area. Examples of perimeter patrol applications are prisons, airports, schools, sea ports, and military installations. Larger-scale applications include patrol of geographic borders.

A common application is for an area where there is a particular need for security and protection against "anomalies". Examples of perimeter anomalies are objects blocking a perimeter path, fence or wall breaches, or unauthorized persons crossing the perimeter.

Conventional methods for perimeter patrol use human operators of small to mid-sized vehicles. This approach places the human operators in a dull environment, where repetition can lead to complacency and where detection of anomalies requires human perception and attention. Funding is often a limiting factor as to how many vehicles and personnel can be devoted to the patrol system.

A more modern approach is using unmanned ground vehicles to autonomously (without human intervention) perform the patrol tasks. The technology for an automated perimeter patrol system can be expensive, but such a system can significantly improve overall reliability in detecting anomalies.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a perimeter patrol system that uses unmanned ground vehicles (UGVs) with cooperative control. The term "unmanned ground vehicle" is used herein in a broad sense, and includes robots and other devices having varying degrees of autonomy and means for locomotion across the ground.

More specifically, as used herein, an "unmanned ground vehicle" or "UGV" is a vehicle that operates while in contact with the ground and without an on-board human presence. Generally, the vehicle will have a set of sensors to observe the environment. The vehicle is capable, to varying degrees of sophistication, to either autonomously make decisions about its own behavior or to pass the information to a human operator at a different location who may exercise additional (non autonomous) control of the vehicle through telecommunications. For the patrol method and system described herein, the autonomous capabilities of the UGV's may vary from vehicle to vehicle and are discussed below.

As explained below, the system enables multiple unmanned ground vehicles to share currently perceived information about their environment and to coordinate a response without the need for a central controller. Various algorithms discussed herein enable this cooperative sensor sharing and decentralized response coordination to detected anomalies. The algorithms are not dependant on the specific vehicle type, available sensors, path planning capabilities, or communications hardware, and are scalable and extensible for any number of vehicles.

The system allows the integration and relative positional correlation of disparate sensor data from two or more separately moving unmanned ground vehicles. A communication message protocol is used to exchange information and to coordinate a system response.

Figure 1:
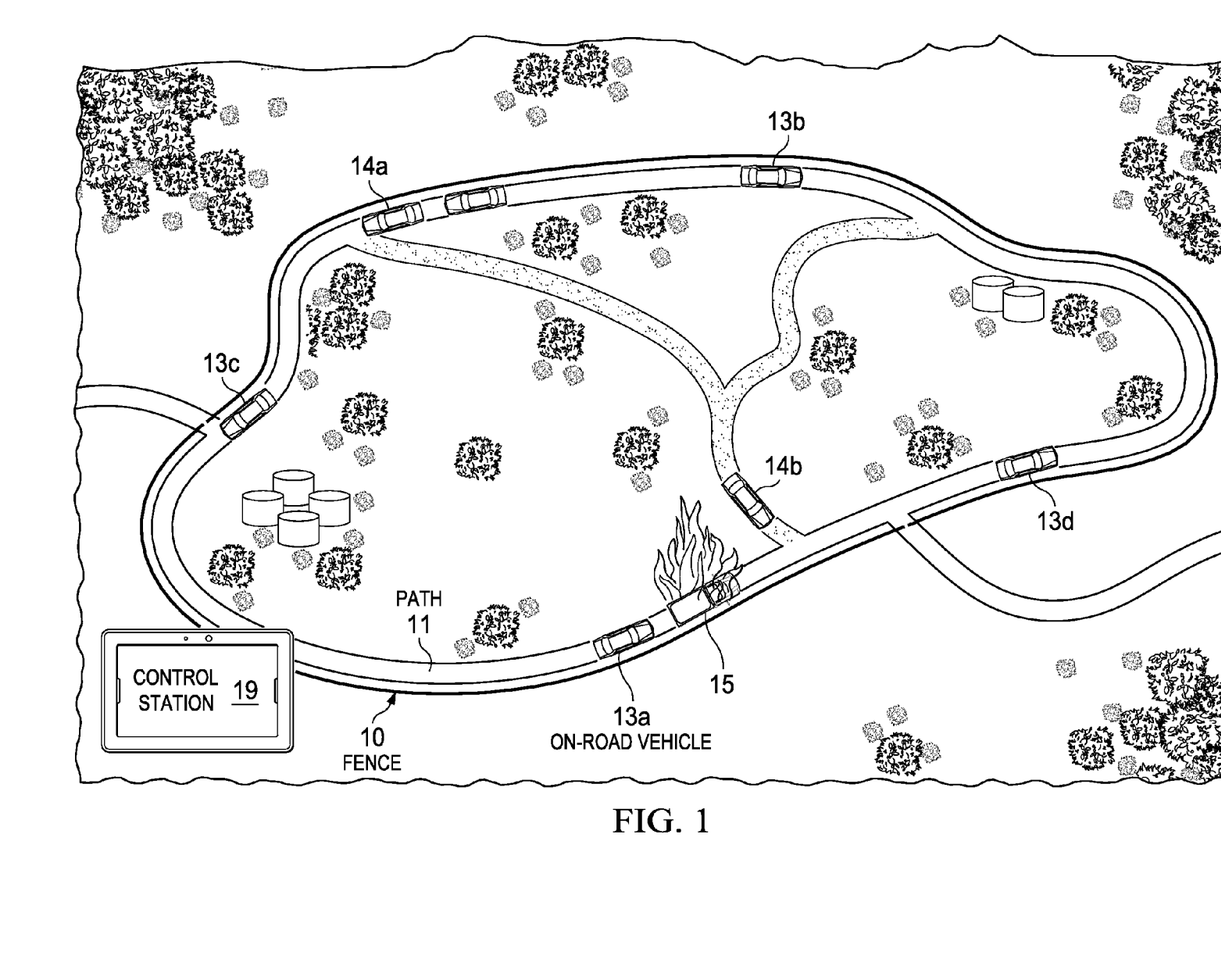
FIG. 1 illustrates an example of a protected region having a patrol system in accordance with the invention.

FIG. 1 illustrates an example of a protected region, enclosed and defined by a perimeter fence or other barrier 10. A path 11, suitable for unmanned ground vehicles runs along and just inside fence 10. For purposes of example, path 11 generally conforms to the perimeter geometry, but as long as the patrol objectives described herein are achieved, path 11 may vary from this exact geometry.

The travel of vehicles on path 11 is referred to herein as "on-road" travel. Additional paths (not shown) may be added across the protected region.

The smoothness and levelness of path 11 are appropriate for the particular type of unmanned ground vehicle. In general, the more rugged the path 11, the more sophisticated is the locomotion system of the vehicles. As explained below, however, a feature of the invention is that less expensive and complex vehicles may be used for on-road patrol, with additional special vehicles used for "off-road" travel, that is, travel not on a paved or otherwise groomed path.

In the example of FIG. 1, the protected region also includes rugged areas inside path 11. The fleet of unmanned vehicles includes a first type of vehicle that travels only path 11. These vehicles are referred to herein as "on-road" vehicles 13. FIG. 1 shows four such vehicles, referenced as vehicles 13a-13d.

The fleet of unmanned patrol vehicles also includes a second type of vehicle that is capable of traversing all or some of the interior of the protected region. These vehicles are referred to herein as "off-road" vehicles 14. FIG. 1 shows two such vehicles, referenced as 14a and 14b. Typically, a vehicle 14 that is capable of off-road travel is also capable of on-road travel.

In other embodiments, additional types of vehicles, especially suited for different terrains within the protected region may be included. As explained below, the system is easily scalable. The number of vehicles and the various locomotion mechanics of the vehicles may vary depending on the size and terrain of the protected region.

As further explained below, not all vehicles have the same capabilities. A feature of the invention is that vehicles communicate with each other to determine which, and how many, vehicles are to respond to an anomaly.

In the example scenario of FIG. 1, a burning vehicle 15 has been detected on path 11. The detection has been achieved by sensors on-board the nearest vehicle 13a.

The burning vehicle 15 may be generalized as an "anomaly". The vehicles 13 are configured to detect anomalies of at least four different types. A "path blockage" anomaly is an object that is blocking the path normally traversed during the perimeter patrol mode of an on-road vehicle 13. A "static object" anomaly is similar to a path blockage anomaly, but may be further refined to differentiate a downed tree from a human or animal, which could be detected using thermal sensors. A static object could further include a breach in the perimeter fence 10 or other barrier. A "dynamic object" anomaly is an object that changes position over time. An "evasive object" anomaly is an object that actively seeks to avoid detection by the vehicle through changes in position over time.

The patrol system further has a control station 19, which may be at, or may be remote from, the protected region. Typically, control station 19 is monitored by a human operator. Control station 19 is programmed to receive the various alerts and other messages discussed herein. It has appropriate hardware and software for performing the tasks described herein. It displays a control interface that allows the human operator to intervene in operation of the patrol vehicles 13 and 14 if desired.

Figure 2:
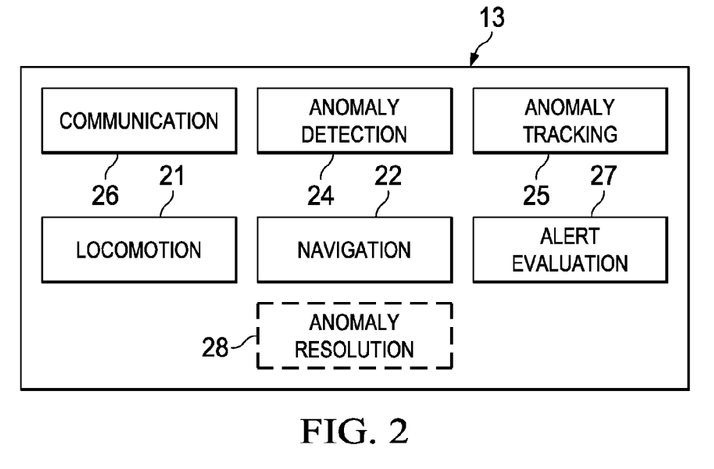
FIG. 2 illustrates various systems with which a patrol vehicle is equipped.

FIG. 2 illustrates various autonomous systems on-board vehicles 13 and 14. The illustrated systems include equipment and processing for basic tasks performed by each on-road vehicle 13 and by each off-road vehicle 14 (in solid outline), as well as for optional tasks that may be performed by only some vehicles (in dashed outline). Each system has mechanical and/or electrical equipment and corresponding processing hardware and software appropriate for performing its tasks.

As explained below, the systems of different vehicles may vary. That is, different vehicles may be equipped to perform different tasks within one of the systems illustrated in FIG. 2, or may perform certain tasks to different levels of complexity.

A feature of the invention is the specialization of vehicles and coordination of responses among vehicles so that the vehicle(s) best equipped to a particular anomaly are the vehicles that autonomously decide to respond. A basic "generic" patrol vehicle can be designed, and individual vehicles equipped with special equipment. Vehicles can travel and respond according to their capabilities, which avoids the need to equip each vehicle with all features.

Each vehicle is assumed to have a locomotion system 21. A vehicle's mechanical equipment for locomotion is referred to generally herein as its "engine". Thus system 21 also includes various control processes for controlling the vehicle's engine.

Each vehicle further has a navigation system 22. The navigation system allows the vehicle to navigate autonomously, that is, without human or other external navigation assistance. Any coordinate system can be used, but typically GPS type coordinates will be used. As explained below, the navigation system of on-road vehicles 13 allows them to travel along path 11. The navigation system of off-road vehicles 14 allows them to travel on more difficult off-road terrain.

Each of the on-road vehicles 13 has an anomaly detection system 24. The detection equipment can be any one or more of various types of sensors. Any kind of imaging, proximity, or other type of sensor for detecting the presence of an object near the detecting vehicle can be used. Off-road vehicles 14 may or may not have detection capabilities; as explained below, an off-road vehicle may be specialized for anomaly resolution.

The anomaly detection system 24 further includes programming or other means for classifying the anomaly into one of the above-described anomaly types. Also, if an anomaly is detected, the detecting vehicle assigns it an identification (ID) number that is used in subsequent messages.

The sensing system on-board a particular vehicle may be specialized for a certain type of anomaly. Some vehicles may be equipped for only one type, whereas other vehicles may be equipped for more than one type. Examples of sensor types are imaging, proximity, and ultrasonic sensors. Sensors can also have varying configurations. For example, a vehicle equipped to detect objects on the path may have forward-sensing sensors. A vehicle equipped to detect breaches in the perimeter fence or other barrier may have side-sensing sensors. A vehicle equipped to detect humans may have infra-red sensors. These are just a few examples of the different types, configurations, and tasks of sensors.

Vehicles 13 or 14 having an anomaly detection system 24 also have an anomaly tracking system 25. As described below, a vehicle that detects an anomaly sends out an alert message to all other vehicles. The detecting vehicle also begins to track the anomaly.

Each patrol vehicle 13 and 14 has a communication system 26. As explained below, messages communicated among vehicles have a specific message structure. As used herein, the term "broadcast" means that a vehicle transmits a message that will be received by all other vehicles and by the control station 19.

Each vehicle 13 and 14 further has an alert evaluation system 27. As explained below, a vehicle's evaluation system 27 has stored data representing features of that vehicle. It receives data about an anomaly, and uses received data and stored data to determine whether it will respond (physically travel) to the anomaly.

An anomaly resolution system 28 is on-board at least one vehicle. As explained below, the system 28 is operable to deal with at least one type of anomaly. A feature of the invention is that certain vehicles may be designated as "anomaly resolution specialists" and have a system 28 especially designed for a certain type of anomaly.

Figure 3:
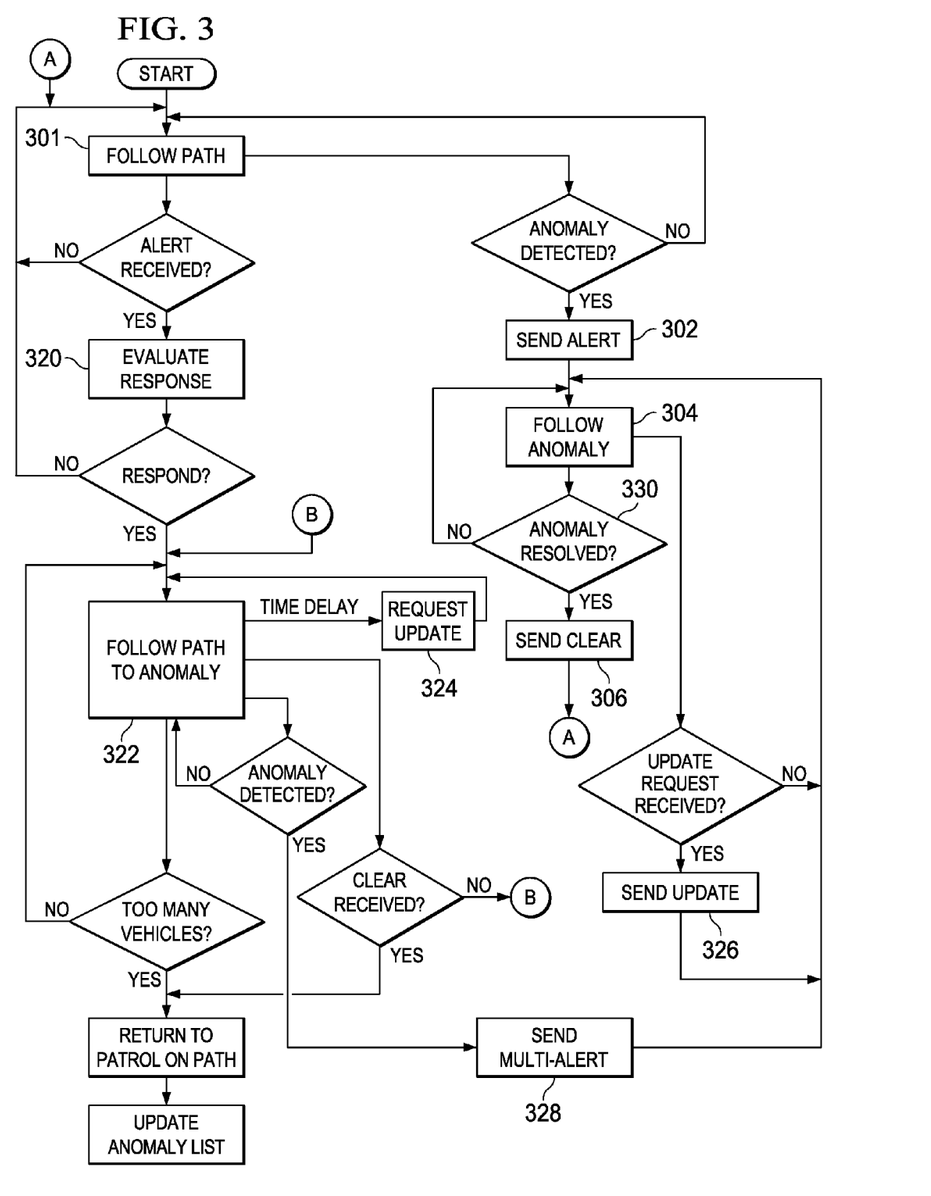
FIG. 3 illustrates the perimeter patrol method.

FIG. 3 illustrates a method of perimeter control, using the system of vehicles 13 and 14 described above. Vehicles 13 and 14 may also be collectively referred to herein as "patrol vehicles".

Step 301 is using on-road vehicles 13 to follow path 11. Each on-road vehicle 13 is in a continuous anomaly detection mode using system 24. Each patrol vehicle 13 and 14 is also in a receive mode, using system 23, ready to receive alert messages from other vehicles 13 that an anomaly has been detected.

Figure 4:
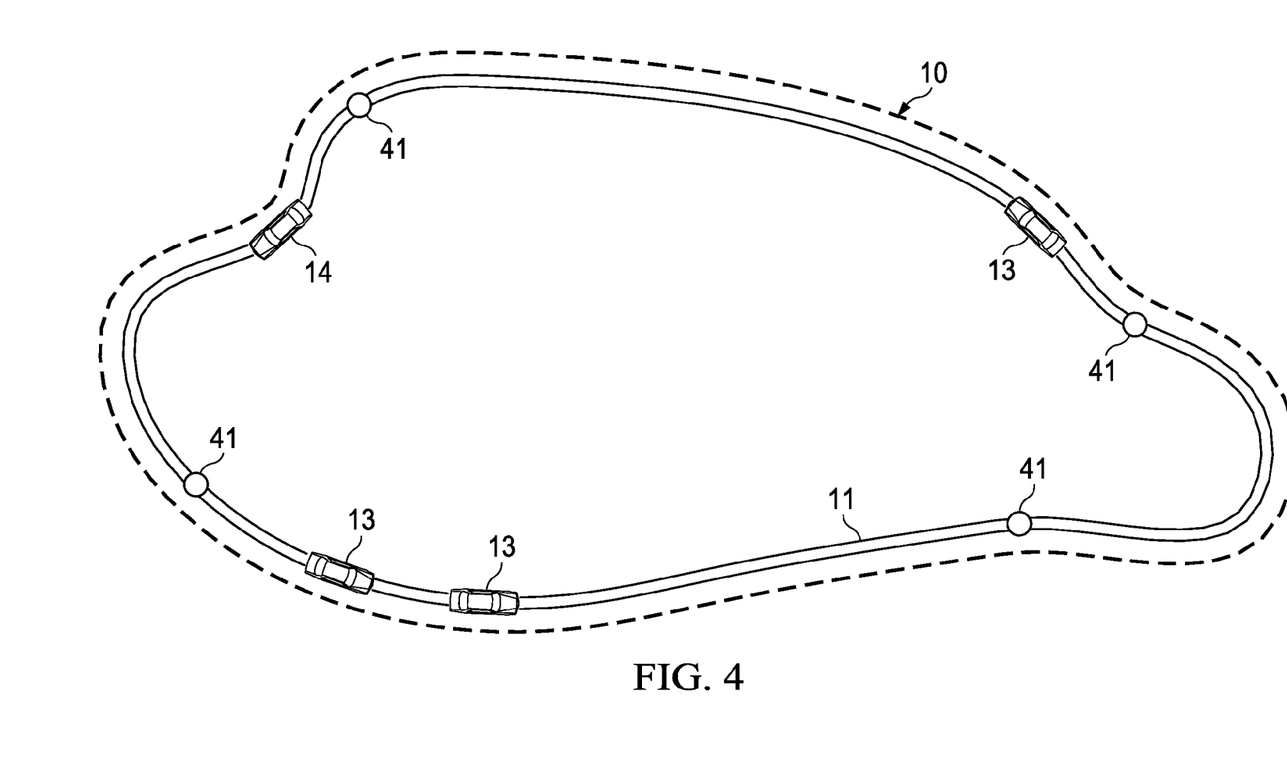
FIG. 4 illustrates four patrol vehicles patrolling a perimeter path.

FIG. 4 illustrates Step 301. The perimeter 10 of a protected region is defined by a barrier, such as a fence 10. A path 11, suitable for on-road vehicles 13, conforms generally to the perimeter and the barrier 10. In the example of FIG. 4, there are three on-road vehicles 13 and one off-road vehicle 14.

Each on-road vehicle 13 is programmed to follow at least a portion of path 11. The patrol route traveled by each vehicle 13 may vary, but typically, each vehicle will traverse the entire path in a single direction. However, many other route strategies are possible, such as one in which each vehicle travels back and forth over a portion of the path.

Along path 11 are one or more observation points 41. An observation point 41 is a location along path 11 at which a vehicle may stop for a period of time. The length of the stop may be predetermined and stored within the vehicle's navigation system 22.

Observation points 41 are particularly useful at locations that are high security, such as a weapons store. Or an observation point may be a location that is geographically advantageous, such as at a point having an elevated altitude.

Depending on the nature of the observation point 41, the vehicle may perform one or more of various tasks. It may "stop and stare". Or it could inspect an object closely and report to the control station 19.

In general, when vehicles 13 are not responding to an anomaly, they are in a "patrol mode". This means that they follow the perimeter path 11 and stop at various observation points 41 for a set period of time.

Referring again to FIG. 3, Step 302 is performed by a vehicle 13 that has detected an anomaly. This vehicle broadcasts an "alert" message to all other vehicles. Data in the alert message represents at least the location of the detecting vehicle, the location of the detected anomaly, the ID of the detecting vehicle, the anomaly type, and an anomaly ID.

In Step 304, the detecting vehicle tracks the anomaly. For example, if the anomaly is in motion, the detecting vehicle physically follows the anomaly according to that vehicle's navigation capabilities. Alternatively, the detecting vehicle tracks the anomaly by maintaining sensor contact, visual or other.

Step 306 is performed if the anomaly is resolved. In this case, the detecting vehicle broadcasts an "anomaly clear" message. Step 306 may also be performed by other vehicles that have arrived at the location of the anomaly.

Step 320 is performed by any vehicle 13 and 14 that has received an alert message. Vehicles that receive an alert message then calculate the distance to the anomaly. This distance calculation is based on the anomaly position in the received message and on the location of the receiving vehicle. The calculation is thus reliant on data from the locomotion system 21 and is part of the anomaly alert evaluation system 27.

The evaluation of an alert-receiving vehicle of its own response (whether or not to physically navigate to the location of the anomaly) involves evaluating if it is appropriately equipped to travel to the anomaly and to respond to the anomaly type. For example, the vehicle may determine that it is too far away, is not properly equipped to respond, cannot handle the terrain in the area of the anomaly, or that other vehicles are better equipped or closer. This evaluation may depend on the type of the anomaly that has been detected.

Referring again to FIG. 2, evaluation of an alert is performed by the alert evaluation system 27 in accordance with response rules and thresholds. These rules and thresholds may be predetermined and stored. Alternatively, thresholds may be modified by a human operator at control station 19 in real-time relative to the anomaly or at any other time. Alternatively or in addition, the vehicles themselves may be programmed to modify the thresholds through a collective decision-making process.

Various additional evaluation rules and criteria can be used by a vehicle's programming to determine whether that vehicle has on-board features that make it suitable to respond. For example, only certain vehicles may have the sensors suitable for detection and/or for following the particular anomaly. Or, a vehicle may be faster or have other features of its locomotion system 21 that enable it to reach the anomaly. Or, a vehicle may have special disarming or capturing equipment as part of its anomaly resolution system 28.

If a vehicle has the appropriate on-board features to respond, at least two additional rules determine whether that vehicle responds to an anomaly alert. First, the vehicle responds only if the number of responding vehicles is less than a "response crowding" threshold. Second, the vehicle responds only if the distance to the anomaly is less than a "response distance" threshold. As stated above, a user interface of control system 19 displays the activity of the vehicles in real-time. A human operator may monitor the display and adjust thresholds.

Referring again to FIG. 3, Step 322 is performed by vehicles that have received an anomaly alert, have evaluated the alert, and are responding by following path 11 to the anomaly.

Figure 5:
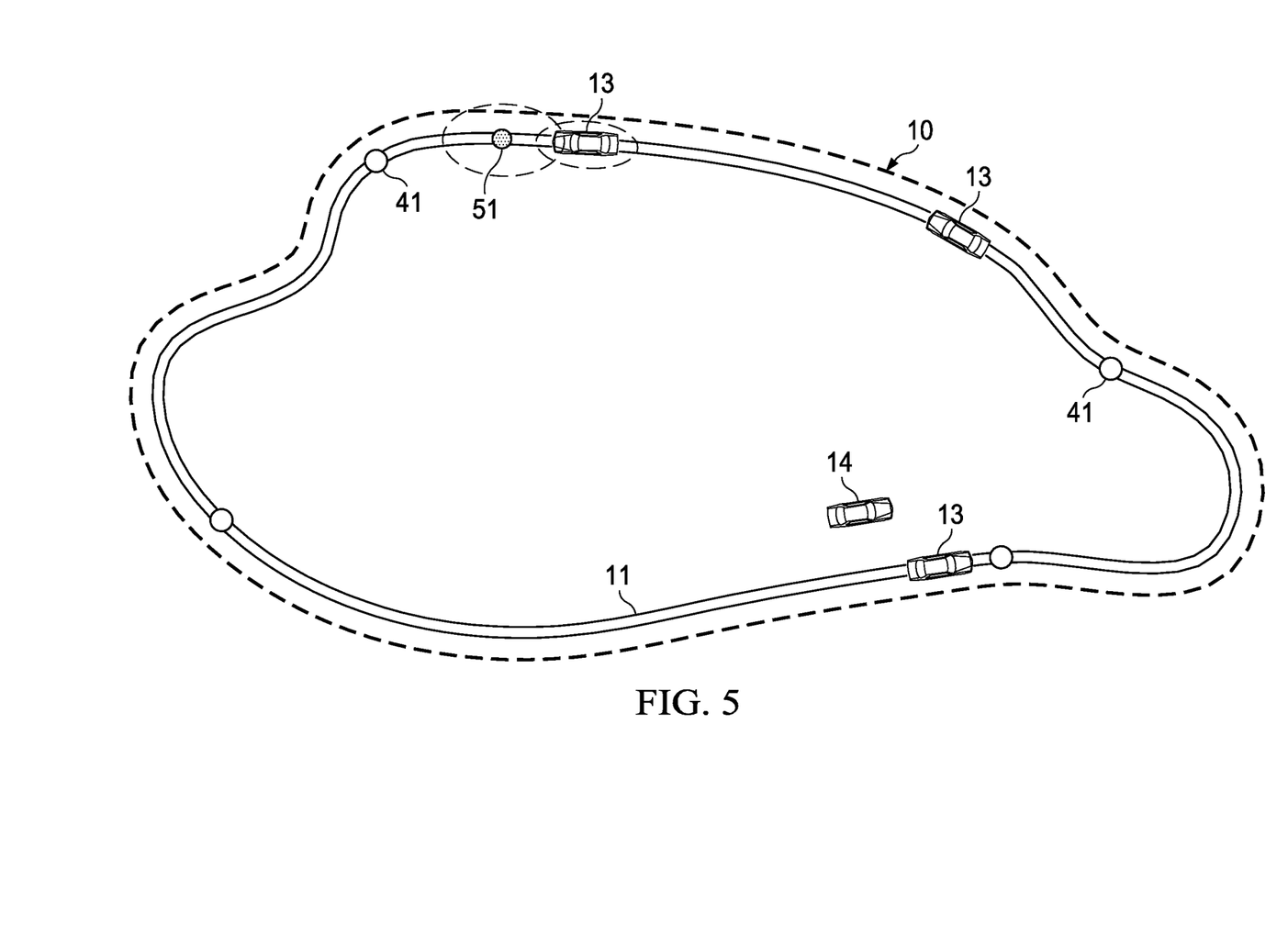
FIG. 5 illustrates detection of an anomaly on the path.

FIG. 5 illustrates a scenario in which an anomaly 51 has been detected along path 11 by a detecting vehicle 13 (D). This vehicle 13 has broadcast an alert message. Receiving vehicles 13 and 14 have evaluated the alert message (Step 320). One receiving vehicle is an on-road vehicle 13 and one receiving vehicle is an off-road vehicle 14. Both vehicles have determined that the appropriate action is to travel to the anomaly (Step 322). A fourth vehicle 13 has determined that it is not equipped, or is too far away, or is superfluous to respond.

All or some vehicles 13 and 14 are programmed with "path planning" capabilities. Referring to FIG. 2, this programming is an optional task of a vehicle's navigation system 22. Some vehicles must remain on their existing patrol route to travel to the anomaly. Other vehicles can plan a path that is not part of its normal patrol route or is an "off-road" path to the anomaly.

FIG. 5 is also an example of a screen display at control station 19. As in FIG. 4, vehicles and anomalies are graphically represented. Vehicles that have arrived at, or are en-route to, an anomaly are also depicted, such as by the solid oval outlines in FIG. 5.

FIG. 5 further depicts each vehicle's sensor horizon. A "sensor horizon" is the farthest effective range of a given sensor type to detect an anomaly. This range is based on the sensor type and placement on the vehicle. In FIG. 5, the dotted oval outlines represent sensor horizons, and are displayed only when a vehicle has detected an anomaly. The shape of the outline can be indicative of the direction of the range, such as a semi-circular shape for a forward-looking sensor.

Step 324 is performed by responding vehicles, such as vehicles 13 and 14 of FIG. 5. These vehicles may at any time, or on a periodic basis, send an update request to the detecting vehicle 13. The update requests are particularly significant in the case of a mobile anomaly type, because such an anomaly may have moved since the last alert message was received. The movement of an anomaly over time may alter a responding vehicle's navigation behavior, as determined by that vehicle's alert evaluation system 27 and navigation system 22.

If the detecting vehicle 13 receives an update request, in Step 326, it delivers an "update" message. This message has data representing the anomaly type, ID, and location, and the detecting vehicle's location and ID. Typically, because the detecting vehicle 13 has been following the anomaly, the detecting vehicle's location will be near the anomaly location.

As responding vehicles are en route to anomaly 51, they may continue to detect additional anomalies. In Step 328, if additional anomalies are detected, the detecting vehicle(s) broadcast a "multi-alert" message. Like other alert messages, a multi-alert message contains the vehicle location and ID and the anomaly type, ID, location. Additionally, a multi-alert message contains an anomaly list, which contains the ID and type of all detected anomalies.

To prevent too many or too few responding vehicles at the location where an anomaly has been detected, the vehicles use two strategies. The processing for these strategies may be part of the anomaly evaluation system 27.

A first strategy is that each detecting vehicle periodically sends out an update to all other vehicles (Step 326). This update message may include a count of arriving vehicles.

Responding vehicles can use this update to reassess their individual response. If enough vehicles have already arrived at the anomaly, a vehicle that is en-route to respond will switch back to the perimeter patrol mode. If not enough vehicles have decided to respond, a vehicle may choose to respond.

A second strategy to prevent overcrowding is that if too many vehicles have arrived at the location of the anomaly, through their normal perimeter patrol routes, a vehicle will, if possible, reverse its direction of travel. The determination of overcrowding is accomplished through the calculation of a local vehicle density, defined as the number of vehicles within a proximity threshold, and is a configurable parameter.

Step 330 is determining whether the anomaly has been or can be resolved. The anomaly may require no action. Or, upon arriving at the anomaly, if appropriately equipped, a vehicle will resolve the anomaly such as by disarming or destroying it. As illustrated in FIG. 2, one or more vehicles may be equipped with an optional anomaly resolution system 28.

Figure 6:
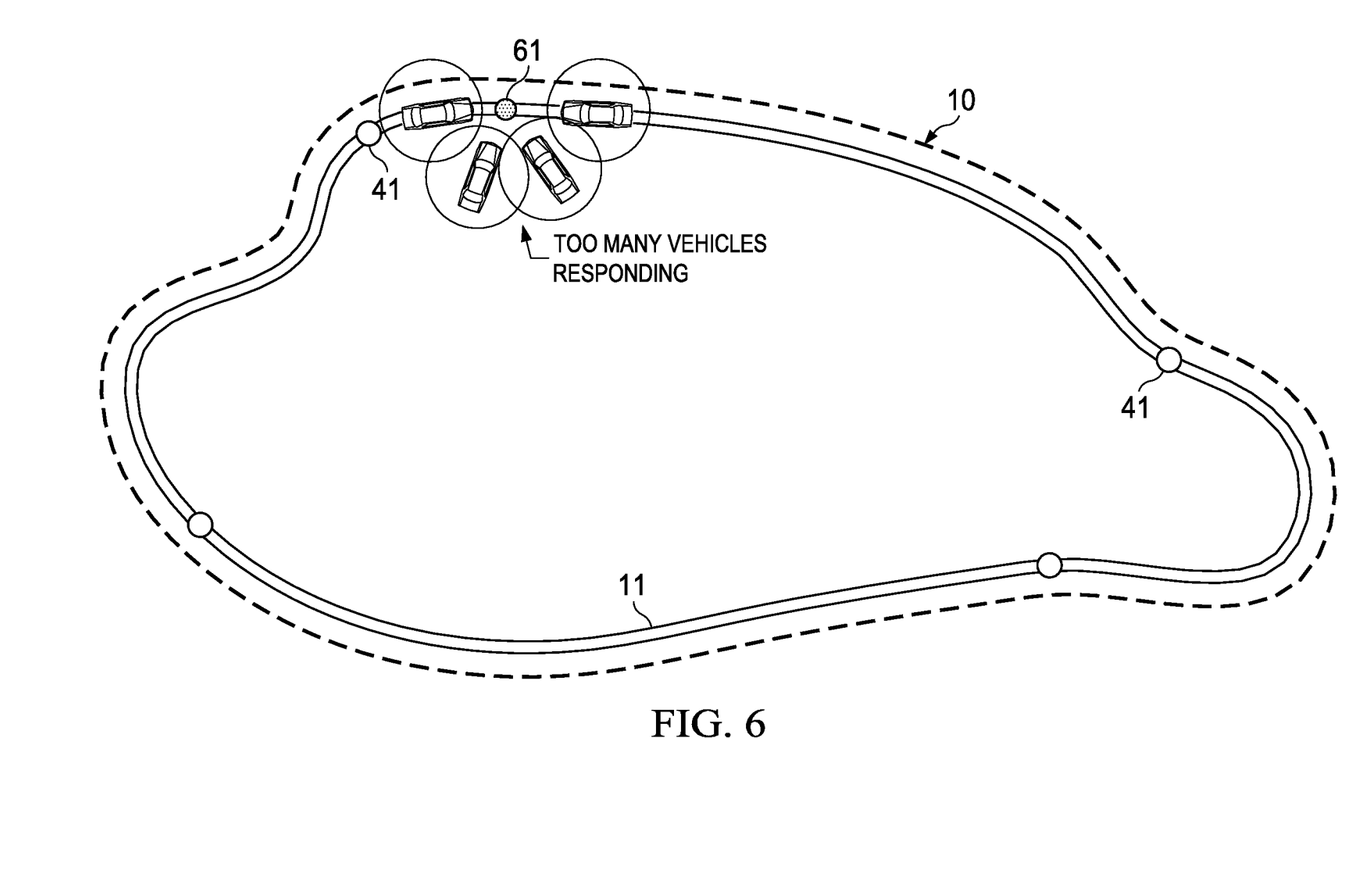
FIG. 6 illustrates patrol vehicle overcrowding in response to an anomaly alert.
Figure 7:
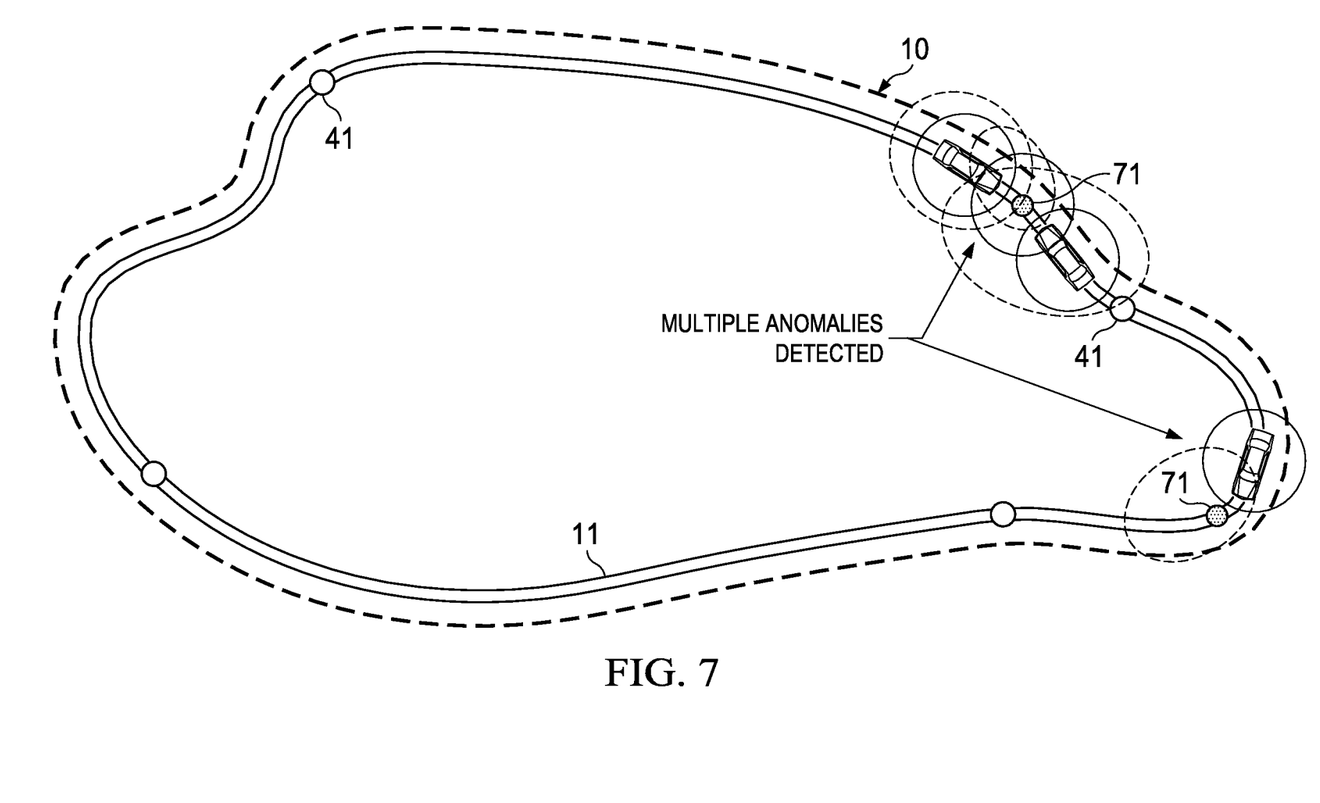
FIG. 7 illustrates detection of two anomalies on the path.

Like FIGS. 4 and 5, FIGS. 6 and 7 illustrate examples of user display screens at control station 19. As in FIG. 5, the status of a vehicle as "detecting" and "responding" is graphically depicted, such as by the solid outlines. FIG. 7 also shows sensor horizons with dotted outlines.

As stated above, a human operator may monitor the display. The display has features that allow the operator to set the above-described evaluation thresholds. The operator may intervene in a vehicle's decision making to whatever extent is programmed into the patrol system.

In FIG. 6, too many vehicles have responded to an anomaly. The operator may redirect one or more of the vehicles. In FIG. 7, more than one anomaly 71 has been detected. If an appropriate number of vehicles to respond is limited, the operator may determine priorities and intervene accordingly.

An advantage of avoiding overcrowding at an anomaly is that the patrol system cannot be circumvented by a diversion anomaly that attracts so many vehicles that additional anomalies can arise undetected and undeterred.

What is claimed is:

1. A method of patrolling a perimeter of a geographic area, using two or more unmanned vehicles having means for locomotion along a perimeter path, comprising:
   equipping each vehicle with a navigation system operable to autonomously navigate the unmanned vehicle along the path;
   equipping each vehicle with an anomaly detection system, operable to detect objects on and near the path while in a continuous detection mode;
   equipping each vehicle with a communications system operable to communicate at least the following types of messages: anomaly alert messages, anomaly update request messages, and anomaly update messages;
   equipping each vehicle with an anomaly tracking system, operable to track, visually or by following, a detected anomaly;
   equipping each vehicle with an alert evaluation system, the evaluation system having memory for storing evaluation rules;
   wherein each vehicle is operable to: travel the path on a predetermined route while in the continuous detection mode, broadcast an alert message to all other vehicles if that vehicle detects an anomaly, to perform an evaluation of any received alert message to determine if it will travel to an anomaly based on the evaluation rules, and to respond to an alert message based on the evaluation.

2. The method of claim 1, wherein each vehicle travels around the path in a continuous circuit in one direction.

3. The method of claim 1, further comprising designating observation points along the path, at which vehicles stop for a time period.

4. The method of claim 1, wherein at least one vehicle is further equipped with an anomaly resolution system.

5. The method of claim 1, further comprising equipping at least one vehicle with an enhanced locomotion system, operable to move the vehicle on interior portions of the protected region and off of the path.

6. The method of claim 1, further comprising equipping at least one unmanned vehicle with an enhanced anomaly detection system having sensors not on-board other vehicles.

7. The method of claim 1, wherein the evaluation is based on stored data representing physical features of that vehicle.

8. The method of claim 1, wherein the alert message contains data representing an identifier of the detecting vehicle, the location of the detection vehicle, an anomaly identifier, and an anomaly type.

9. The method of claim 8, wherein the alert message further contains data representing the location of the anomaly.

10. The method of claim 1, wherein each vehicle is operable to calculate the distance to an anomaly and wherein the evaluation is based at least in part on the distance.

11. The method of claim 1, wherein the evaluation is based on the number of other vehicles responding to the anomaly.

12. The method of claim 1, wherein each vehicle is further operable to broadcast an alert update message after receiving an alert message, and wherein any vehicle detecting an anomaly is further operable to broadcast update messages.

13. The method of claim 12, wherein an update message contains a current location of the anomaly.

14. The method of claim 12, wherein an update message contains the number of vehicles responding to the anomaly.

15. The method of claim 1, wherein the anomaly detection system is operable to detect a breach in a perimeter barrier.

* * * * *